Figure 1:
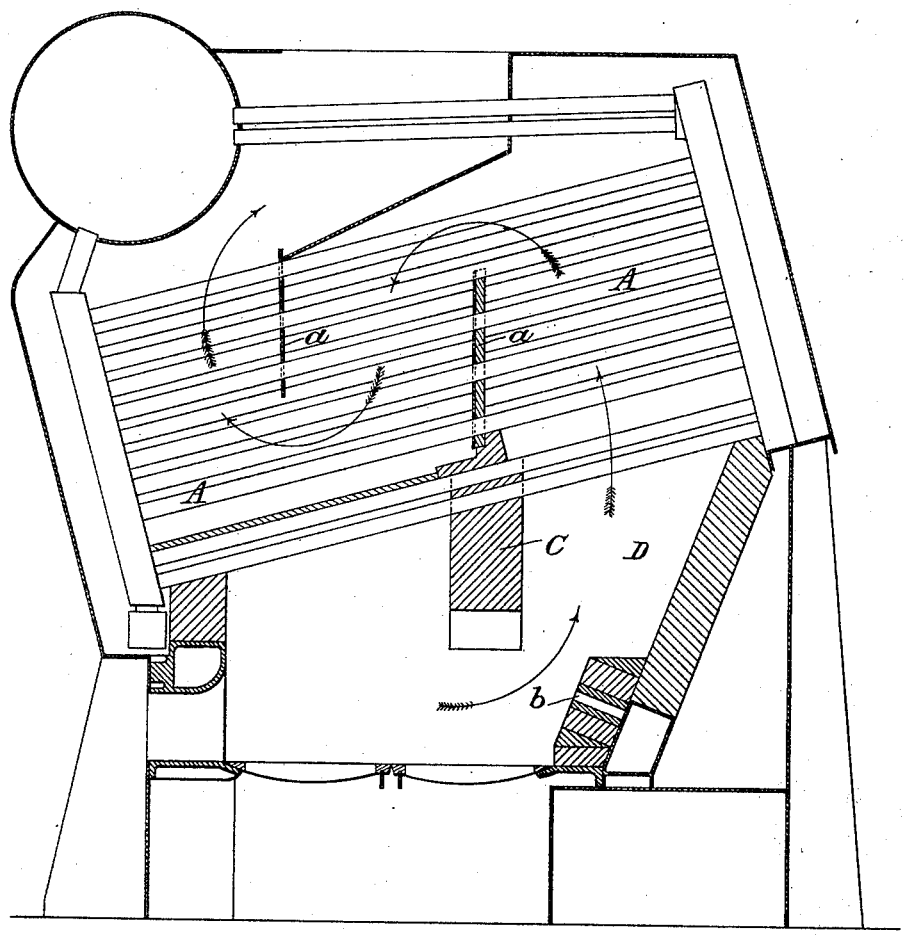

No. 707,509. Patented Aug. 19, 1902.
S. A. GRAHAM.
BOILER AND ITS FURNACE.
(Application filed Apr. 18, 1902.)

(No Model.) 8 Sheets—Sheet 1.

WITNESSES: INVENTOR
SAMUEL ADAM GRAHAM.
BY
Howson and Howson
HIS ATTORNEYS.

No. 707,509. Patented Aug. 19, 1902.
S. A. GRAHAM.
BOILER AND ITS FURNACE
(Application filed Apr. 18, 1902.)

(No Model.) 8 Sheets—Sheet 3.

WITNESSES

INVENTOR
SAMUEL ADAM GRAHAM
BY
HIS ATTORNEYS.

No. 707,509. Patented Aug. 19, 1902.
S. A. GRAHAM.
BOILER AND ITS FURNACE.
(Application filed Apr. 18, 1902.)
(No Model.) 8 Sheets—Sheet 5.

WITNESSES

INVENTOR
SAMUEL ADAM GRAHAM
BY
HIS ATTORNEYS.

No. 707,509. Patented Aug. 19, 1902.
S. A. GRAHAM.
BOILER AND ITS FURNACE.
(Application filed Apr. 18, 1902.)
(No Model.) 8 Sheets—Sheet 6.

WITNESSES:
F. W. Wright
S. C. Connor

INVENTOR
SAMUEL ADAM GRAHAM
BY
Howson and Howson
HIS ATTORNEYS.

No. 707,509.  
S. A. GRAHAM.  
BOILER AND ITS FURNACE.  
(Application filed Apr. 18, 1902.)  
Patented Aug. 19, 1902.

(No Model.)  
8 Sheets—Sheet 7.

WITNESSES:  
F. W. Wright  
S. C. Connor

INVENTOR  
SAMUEL ADAM GRAHAM  
BY  
Howson and Howson  
HIS ATTORNEYS.

No. 707,509. Patented Aug. 19, 1902.
S. A. GRAHAM.
BOILER AND ITS FURNACE.
(Application filed Apr. 18, 1902.)

(No Model.) 8 Sheets—Sheet 8.

WITNESSES:
F. W. Wright.
S. C. Connor.

INVENTOR
SAMUEL ADAM GRAHAM
BY
Howson and Howson
HIS ATTORNEYS.

UNITED STATES PATENT OFFICE.

SAMUEL ADAM GRAHAM, OF SHEFFIELD, ENGLAND, ASSIGNOR OF ONE-HALF TO JOHN BROWN AND COMPANY, LIMITED, OF SHEFFIELD, ENGLAND.

BOILER AND ITS FURNACE.

SPECIFICATION forming part of Letters Patent No. 707,509, dated August 19, 1902.

Application filed April 18, 1902. Serial No. 103,604. (No model.)

*To all whom it may concern:*

Be it known that I, SAMUEL ADAM GRAHAM, marine engineer, a subject of the King of Great Britain and Ireland, residing at 1 Vivian road, Firth Park, Sheffield, in the county of York, England, have invented certain new and useful Improvements in or Connected with Boilers and Their Furnaces; and I do hereby declare the following to be a full, clear, and exact description of the invention, such as will enable others skilled in the art to which it appertains to make and use the same.

This invention relates to boilers and furnaces provided with arrangements in accordance with the specification of Patent No. 691,089, dated the 14th day of January, A. D. 1902, and especially to an arrangement such as is described with reference to Figures 4 and 5 of the drawings accompanying that specification.

According to the present invention a bridge is provided beneath the water-tubes so as to depend sufficiently forward of the rear end of the furnace and the air-inlets at the said rear end as to form a combustion-chamber beneath the rear portion of the water-tubes, in which combustion-chamber the volatile products of combustion from the fire-chamber mixing with and the heated air admitted by the said air-inlets are received and burned, the said bridge forming, with the ordinary fire-bridge of the boiler, a contracted passage or throat which deflects the said products from the furnace, so that they meet the air entering by the said air-inlets and are thoroughly commingled with the said air and pass therewith into the said combustion-chamber, causing an efficient combustion of the mixture of the said air and products to take place, the hot gases passing thence between the water-tubes. The said bridge may be made of fire-brick or fire-clay or in other convenient way. For instance, it may be constructed of a metal bar of T or other form protected by brick-work or fire-clay, or it may be made hollow and either of fire-brick or fire-clay or of metal, with or without fire-brick or fire-clay protection and with means for passing hot air therethrough and therefrom to meet the products passing from the furnace, or the ends of the said bridge may be open, so that air passes through with or without entering the furnace, or water may be passed through the said hollow bridge by means of pipes connected with the water and steam spaces of the boiler, so as to give proper circulation through the said hollow bridge.

The accompanying drawings represent several constructions in accordance with this invention.

Figure 2:
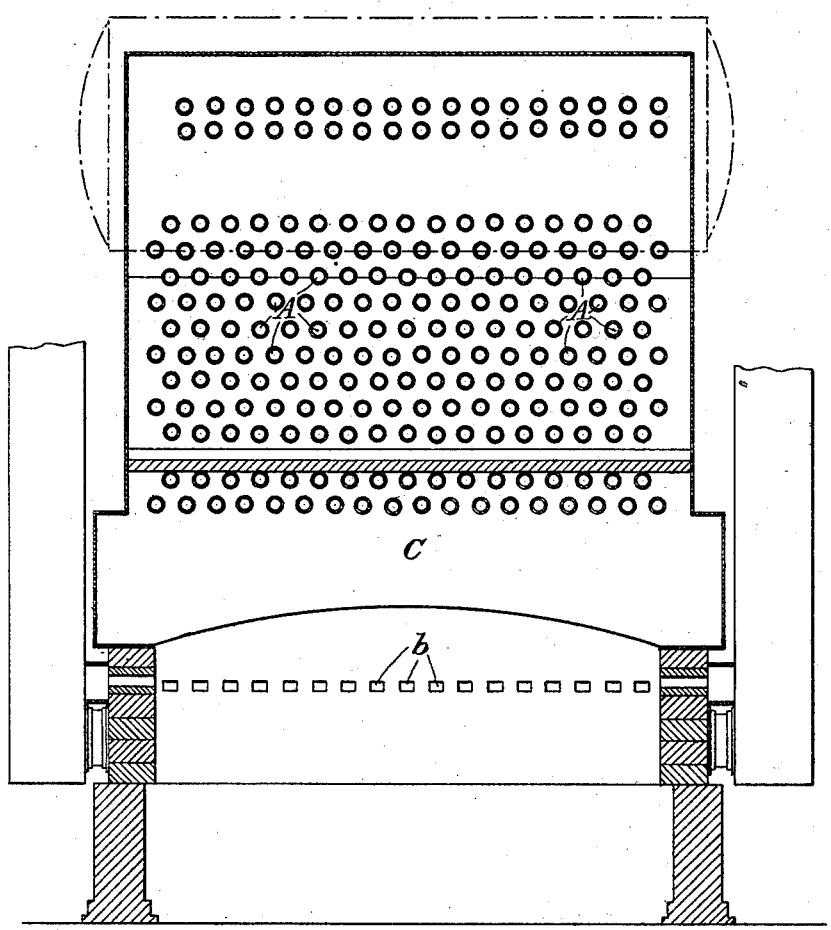
Figure 3:
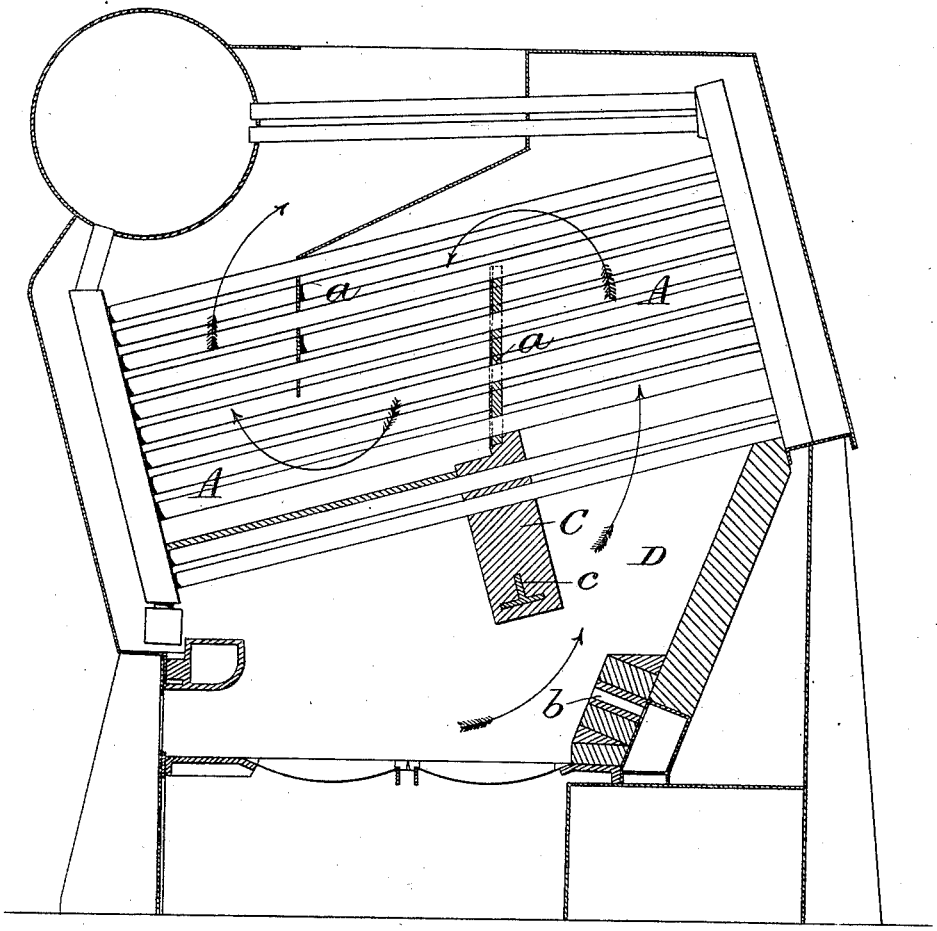
Figure 4:
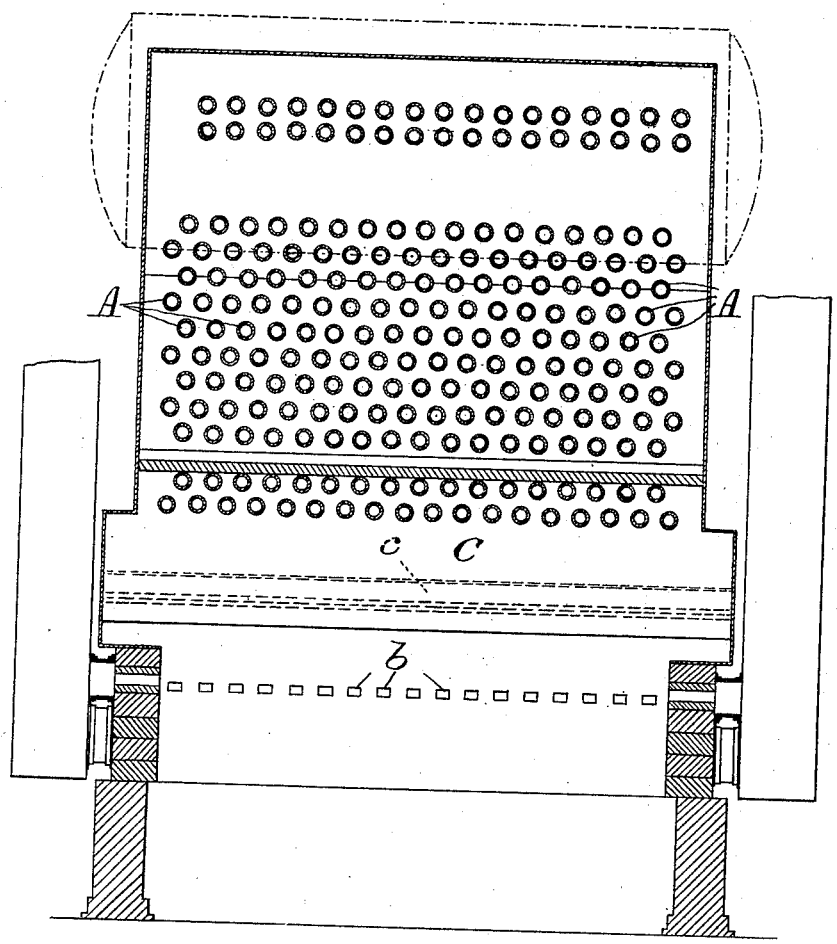
Figure 5:
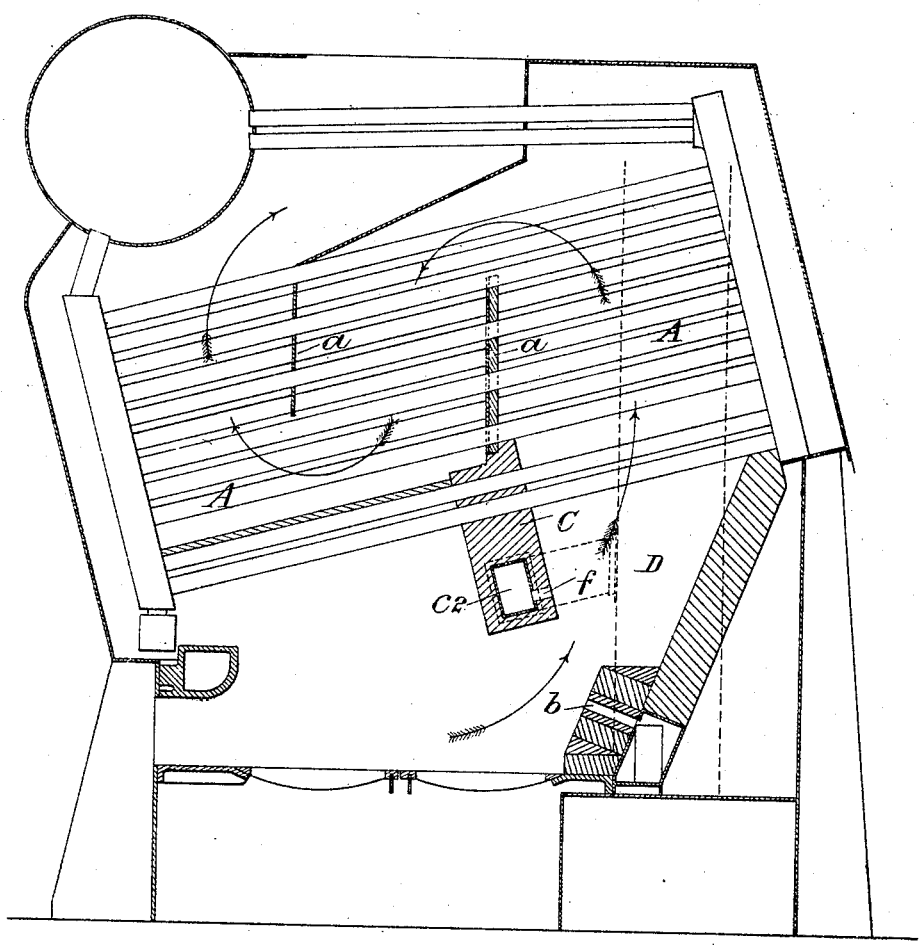
Figure 6:
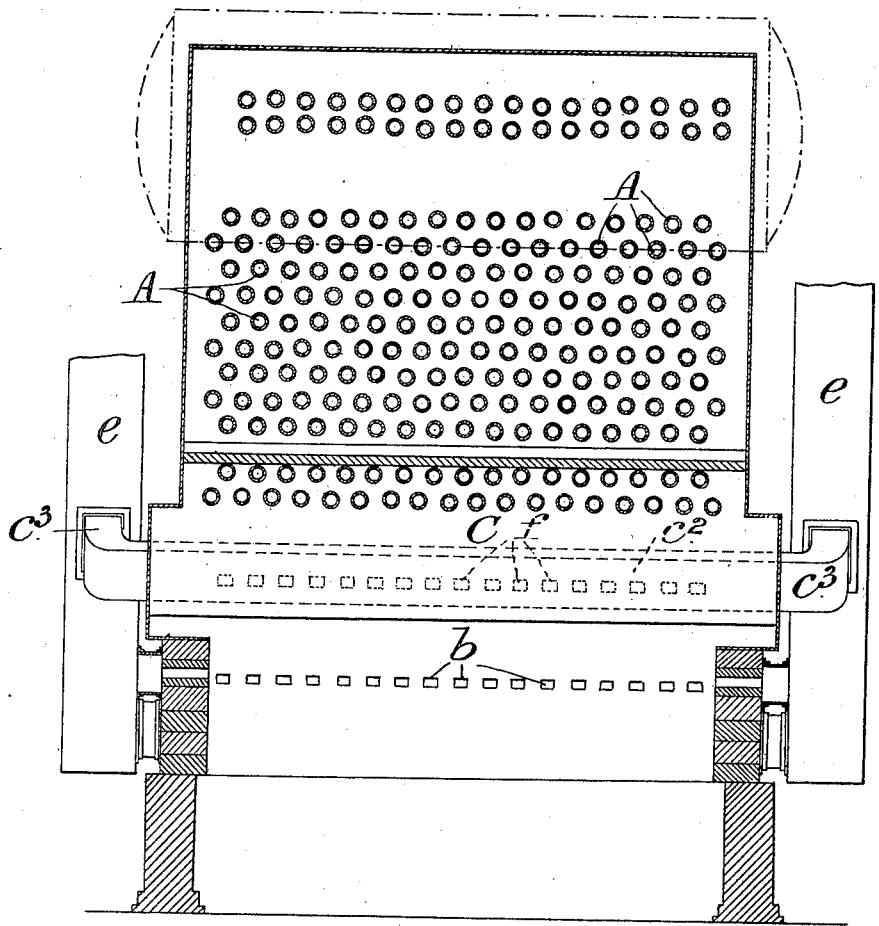
Figure 7:
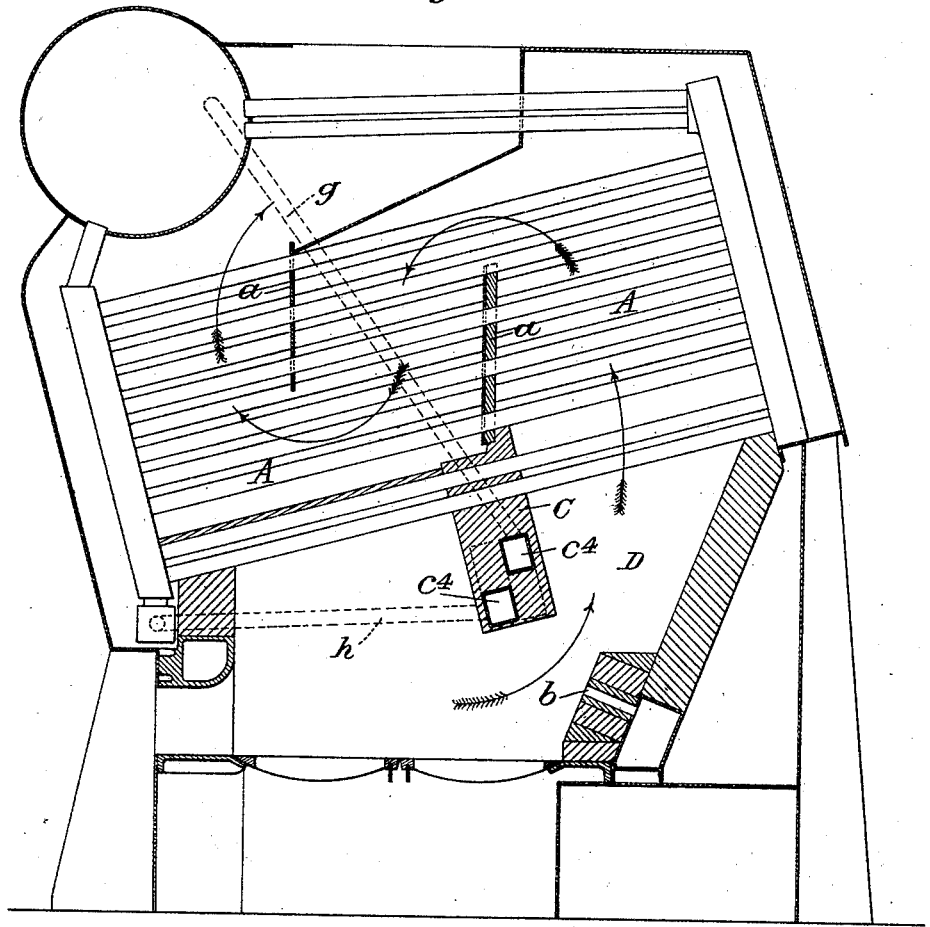
Figure 8:
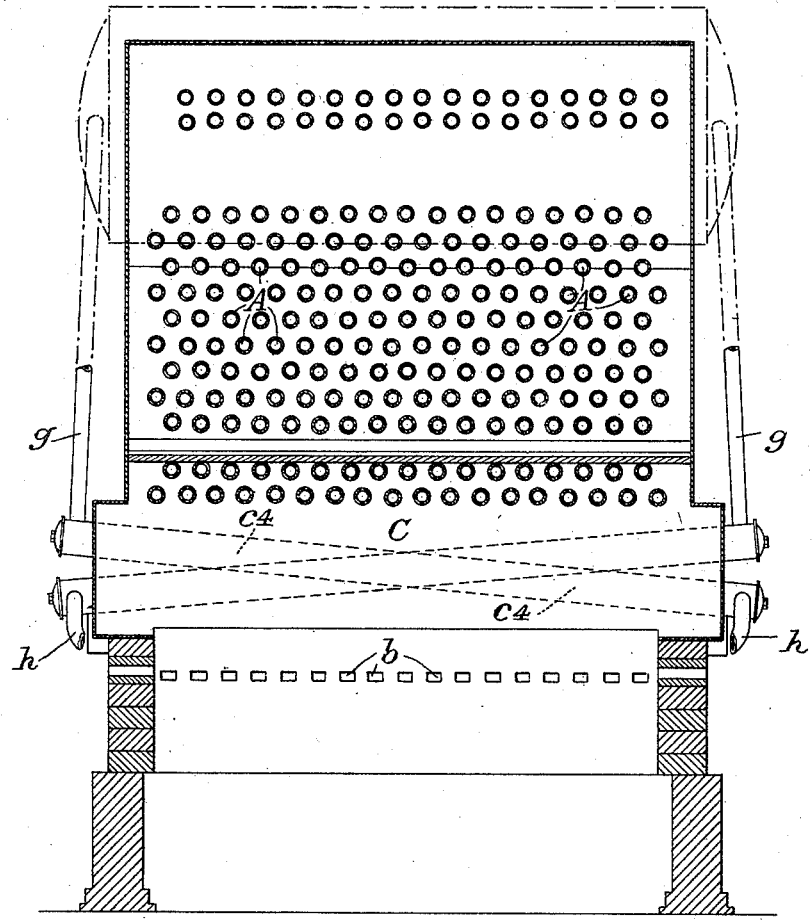

Figs. 1 and 2 are vertical sections at right angles to each other, showing the said bridge made in the form of a fire-brick arch. Figs. 3 and 4 are similar views showing the said bridge made of a metal bar of T form protected by fire-clay. Figs. 5 and 6 are similar views showing the said bridge made of hollow metal protected by fire-clay and provided with means for passing hot air thereinto and therefrom into the combustion-chamber at the rear of the bridge, and Figs. 7 and 8 are similar views showing the said bridge made of hollow-metal passages with connections for passing water therethrough and protected by fire-clay.

In all the figures the water-tubes are marked A, and the deflectors for causing the hot gases to take a circuitous path among the tubes are marked $a$. The air-inlets at the rear end of the furnace are marked $b$.

C is the bridge, provided according to this invention to constitute the aforesaid combustion-chamber at D. In the construction Figs. 1 and 2 the said bridge is made of solid fire-clay or of fire-bricks. In the construction Figs. 3 and 4 the said bridge is made to extend horizontally across the furnace and is made of fire-clay or fire-bricks, inclosing a metal bar $c$ of T form. In the construction Figs. 5 and 6 the said bridge consists of a hollow metal casing $c^2$, surrounded by fire-clay or fire-bricks and connected by the ends at $c^3$ with the ducts $e$ for hot air. Openings through the bridge at $f$ allow the hot air to pass from the casing $c^2$ into the combustion-chamber D. The casing $c^2$ may be made open to the atmosphere at the ends and with or without the openings $f$ to allow air to pass either into the furnace or simply through the casing $c^2$ to keep the arch at a moderate temperature. In the arrangement Figs. 7 and 8 the bridge consists of inclined water-passages $c^4$, connected with the steam-space by pipes $g$ and with the lower part of the water-space by pipes $h$, so that the said passages $c^4$ constitute additional water-heating spaces in the boiler. In all cases it will be observed the air is directed from the ordinary bridge-wall near its base across the contracted passage and toward the front of the depending bridge, so that there is a thorough mixture of the hot gases with the air, which mixture then passes through the contracted passage into the rear combustion-chamber.

Having now particularly described and ascertained the nature of this invention and in what manner the same is to be performed, I declare that what I claim is—

1. A water-tube boiler having a fire-chamber and a bridge-wall at the rear and extending upwardly from the bottom thereof, a combustion-chamber for the gases in the rear of the fire-chamber, water-tubes above both chambers, a depending bridge from the tubes between the two chambers, the said depending bridge and the bridge-wall forming a contracted passage between the two chambers, and means for directing air from the lower part of the bridge-wall across the contracted passage and toward the front of the depending bridge, substantially as described.

2. A water-tube boiler having a fire-chamber and a bridge-wall at the rear and extending upwardly from the bottom thereof, a combustion-chamber for the gases in the rear of the fire-chamber, water-tubes above both chambers, a hollow depending bridge from the tubes between the two chambers, the said depending bridge and the bridge-wall forming a contracted passage between the two chambers, and means for directing air from the lower part of the bridge-wall across the contracted passage and toward the front of the depending bridge, substantially as described.

3. A water-tube boiler having a fire-chamber and a bridge-wall at the rear and extending upwardly from the bottom thereof, a combustion-chamber for the gases in the rear of the fire-chamber, water-tubes above both chambers, a depending hollow bridge from the tubes between the two chambers and having openings into the rear combustion-chamber for directing air thereinto, the said bridge-wall and depending bridge forming a contracted passage between the two chambers and the bridge-wall having air-inlet openings near the bottom for directing air across said passage and toward the front of the depending bridge, substantially as described.

4. A water-tube boiler having a fire-chamber and a combustion-chamber in the rear of the same, water-tubes above said chamber and extending beyond it, a bridge-wall extending from one end of the fire-chamber to the extending ends of said tubes, a depending bridge from the water-tubes forming with the bridge-wall a contracted passage between the two chambers, and air-inlets near the bottom of the bridge-wall for directing air across said contracted passage and toward the front of the depending bridge, substantially as described.

5. A water-tube boiler having a fire-chamber and a combustion-chamber in the rear of the same, water-tubes above said chamber and extending beyond it, a bridge-wall extending from one end of the fire-chamber to the extending ends of said tubes, a depending bridge from the water-tubes forming with the bridge-wall a contracted passage between the two chambers, means for directing air through said depending bridge into the combustion-chamber, and air-inlets near the bottom of the bridge-wall for directing air across said contracted passage and toward the front of the depending bridge, substantially as described.

In testimony whereof I affix my signature in presence of two witnesses.

SAMUEL ADAM GRAHAM.

Witnesses:
 AARON JOHN PARDOW,
 THOS. R. JOHNSON.